(12) United States Patent
Changyi et al.

(10) Patent No.: US 12,669,407 B1
(45) Date of Patent: Jun. 30, 2026

(54) DEVICE FOR MONITORING STICKING FAULT OF SOLENOID VALVES

(71) Applicants: Zhu Changyi, Shanghai (CN); Meng Yunrui, Shanghai (CN)

(72) Inventors: Zhu Changyi, Shanghai (CN); Meng Yunrui, Shanghai (CN)

(73) Assignee: Primoflo (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 19/176,217

(22) Filed: Apr. 11, 2025

(51) Int. Cl.
G01M 13/003 (2019.01)

(52) U.S. Cl.
CPC ................................. G01M 13/003 (2019.01)

(58) Field of Classification Search
CPC .................................................. G01M 13/003
See application file for complete search history.

(56) References Cited

U.S. PATENT DOCUMENTS

2022/0316981 A1* 10/2022 Gao .................... G01M 13/003

FOREIGN PATENT DOCUMENTS

CN 119269076 A * 1/2025 ............. G01N 3/068

* cited by examiner

*Primary Examiner* — Timothy P Graves
(74) *Attorney, Agent, or Firm* — Riyon Rae Harding

(57) ABSTRACT

The present disclosure relates to the technical field of solenoid valves and discloses a device for monitoring a sticking fault of solenoid valves, comprising an installation platform, an installation plate, a first cylinder, a first installation shell, a displacement mechanism, an installation frame, a wiping mechanism and a solenoid valve. The displacement mechanism is configured such that, through the cooperation of a gear ring, gears, and first gear plates, it is adapted to solenoid valves with different the lengths. A clamping monitoring mechanism is used to clamp the solenoid valve, thereby preventing inaccurate or incomplete clamping. A vibration monitoring mechanism is configured such that, through the cooperation of a tape measure and a miniature camera, it can indirectly determine the vibration amplitude of the solenoid valve, and determines whether the solenoid valve is subjected to a sticking based on the vibration amplitude.

9 Claims, 7 Drawing Sheets

DEVICE FOR MONITORING STICKING FAULT OF SOLENOID VALVES

CROSS-REFERENCE TO RELATED APPLICATIONS

This application takes priority from Chinese Patent Application No. CN2022410449864.5, filed on 15 Apr. 2024, the entirety of which is incorporated herein by reference.

TECHNICAL FIELD

The present invention relates to the technical field of solenoid valves, and, more particularly, to a device for monitoring a sticking fault of solenoid valves.

BACKGROUND

The system for monitoring a sticking fault of solenoid valves is an automated monitoring and control system, and it can monitor the usage of solenoid valves.

When a sticking fault occurs in the solenoid valve, the system for monitoring a sticking fault can automatically recognize the sticking fault, preventing the sticking from affecting the normal use of the solenoid valve.

In the prior art, when monitoring the sticking of solenoid valves, it is difficult to adapted to solenoid valves with different lengths. Because the solenoid valves may be clamped inaccurately or incompletely, affecting the subsequent monitoring effects. Additionally, damage or misalignment of the sealing ring inside the solenoid valve can easily cause sticking of the solenoid valves. It is difficult for some devices to allow air to pass through the solenoid valves when clamping solenoid valves and to compare the pressure difference between both sides of the solenoid valves. Thus, the practicalities of such devices are limited, and it is difficult for operators to determine whether the sealing ring of the solenoid valve has failed.

Moreover, during normal operation, a solenoid valve should maintain a smooth motion. If an abnormal vibration occurs in the solenoid valve, it may be due to the sticking fault thereof. The sticking fault causes the solenoid to be subjected to uneven force during the opening or closing process, resulting in severe vibrations.

However, it is difficult for prior art to quickly monitor the vibration state of solenoid valves during operation.

Finally, the most common causes of sticking are from the interior of the solenoid valves. Sticking can cause a certain part of the solenoid valves to offset, affecting its normal operation. It is difficult for prior art to quickly monitor whether there are obvious scratches or foreign objects on interior walls of the solenoid valve, and to preliminarily determine the location of the sticking. Some devices usually monitor a sticking fault of the solenoid valves based on either vibration or wiping as the only monitoring factor, making it difficult to combine the vibration and wiping for complementary enhancement and improved accuracy. In addition, when using wiping to monitor sticking, it is difficult for the prior art to simultaneously monitor whether the valve core is stuck, and thus the practicality thereof is limited.

SUMMARY

To overcome the defects as described above, the present invention provides a device for monitoring a sticking fault of solenoid valves.

To resolve the foregoing technical problem, an embodiment of the present invention provides the following technical solutions.

The invention is implemented by constructing a device for monitoring a sticking fault of solenoid valves. The device comprises: an installation platform, wherein the installation platform is permanently connected to an installation plate at the center of the front end of the installation platform, the installation plate is permanently connected to a first cylinder at the top thereof, and a push rod at back of the first cylinder is permanently connected to a first installation shell, both left and right ends of the top of the first installation shell are slidably connected to displacement mechanisms, the installation platform is permanently connected to an installation frame at the rear end of the top of the installation platform, both left and right ends of the bottom of a horizontal plate at the top of the installation frame are permanently connected to wiping mechanisms, and a solenoid valve is disposed inside the displacement mechanism.

The displacement mechanism comprises: moving plates, wherein both the top left and right ends of the first installation shell are slidably connected to the moving plates; vibration monitoring mechanisms, which are permanently connected to the moving plates at both the top front end and top rear end thereof; limiting rods, which are permanently connected to the first installation shell at both the interior bottom front end and interior bottom rear end thereof; a gear ring, the bottom of which is slidably connected to the outer wall of the limiting rod; gears, wherein both the interior left and right ends of the gear ring are both engaged with gears; a first motor, wherein the top output shaft of the first motor is permanently connected to bottom of the gear at the interior left end of the gear ring; first gear plates, wherein the gear ringis engaged with the first gear plates at the back of the gear at interior left end thereof; connecting rods, which are permanently connected to the first gear plate at both top left and right ends thereof; wherein, the top of the connecting rod, located at top left end of the first gear plate which is at the back of the gear, is permanently connected to the bottom of the moving plate.

Preferably, the vibration monitoring mechanism comprises: installation rods, wherein the installation rods are permanently connected to the moving plate at both top front and rear ends thereof; a rubber rod, wherein the rubber rod is permanently connected to the installation rod at the right end of the interior bottom thereof; a first electromagnetic block, wherein the electromagnetic block is permanently connected to the upper left end of the rubber rod; a tape measure, wherein the top of the first electromagnetic block is magnetically adsorbed to a hanging buckle fixed on the tape measure; a miniature camera, wherein the miniature camera is permanently connected to the installation rod at the interior left end thereof; a sliding rod, wherein the sliding rod is permanently connected to the top of the rubber rod, and the sliding rod extends through the top right end of the installation rod and is slidably connected to the interior thereof; clamping monitoring mechanisms, wherein the top of the sliding rod is permanently connected to the clamping monitoring mechanism.

Preferably, the clamping monitoring mechanism comprises: a second installation shell, wherein the second installation shell is permanently connected to the top of the sliding rod; a cross frame, wherein the cross frame is permanently connected to the second installation shell, located at the top left end of the first installation shell, at the interior bottom left end thereof; a second cylinder, wherein the second cylinder is permanently connected to the left end of the cross frame; a moving roller, wherein a push rod at the right end of the second cylinder extends through the cross frame and is permanently connected to the moving roller; first connecting plates, wherein four groups of the first connecting plates are disposed on the outer wall of the moving roller at equal spaces; rotating rods, wherein the rotating rods are rotatably connected to both the upper and lower sides of both left and right ends of the first connecting plates; second connecting plates, wherein the second connecting plates are rotatably connected to and inside the four groups of rotating rods at the bottom of the moving roller; L-shaped plates, wherein the L-shaped plates are permanently connected to the bottoms of the second connecting plates; arc-shaped blocks, wherein the arc-shaped blocks are permanently connected to the bottoms of the L-shaped plates; a pressure sensor, wherein the pressure sensor is permanently connected to the center of the top right end of the arc-shaped block; an air inlet pipe, wherein the air inlet pipe is permanently connected to the top rear end of the arc-shaped block; a one-way valve, which is permanently connected to the air inlet pipe at the air inlet thereof; a first rubber gasket, which is internally and permanently connected to the arc-shaped block; a second rubber gasket, wherein there are four groups of the arc-shaped blocks, and they are permanently connected through the second rubber gaskets; a sealing gasket, wherein the sealing gasket is permanently connected to the inner wall of the arc-shaped blocks; wherein, the left ends of the L-shaped plates are slidably connected to the right end of the cross frame, and the solenoid valve is clamped inside the arc-shaped blocks.

Preferably, the wiping mechanism comprises: third installation shells, wherein the third installation shells are permanently connected to both the bottom left and right ends of the horizonal plate located at the top of the installation frame; a second motor, wherein the second motor is permanently connected to the left upper end of the third installation shell located at the bottom left end of the installation frame; a belt transmission component, wherein both upper and lower sides on the right end of the belt transmission component are permanently connected to wheel rods, the wheel rod is segmented and composed of two sets of rod bodies sheathed with each other from left to right, and the two sets of rod bodies are fixed to a solenoid clutch by being plugged into the left and right slots of the solenoid clutch, respectively; a screw rod, wherein the screw rod is permanently connected to the right end of the wheel rod located at the right upper end of the belt transmission component; a moving block, wherein the screw rod extends through the moving block and is connected to the interior thereof via a threaded connection; a limiting plate, wherein the front end of the limiting plate is slidably connected to the outer wall of the moving block; a limiting block, wherein the limiting block is permanently connected to front end of the moving block; a second gear plate, wherein the second gear plate is internally and slidably connected to limiting block; a long gear, wherein the long gear is engaged with the back of the second gear plate, and is rotatably connected to the right lower end of the third installation shell located at the bottom left end of the installation frame; a first fixing rod, wherein the first fixing rod is permanently connected to the bottom of the second gear plate; an installation block, wherein the installation block is permanently connected to the bottom of the first fixing rod; a pressing mechanism, wherein the pressing mechanism is permanently connected to the back of the installation block; a wiping cloth, wherein the wiping cloth is adhesively connected to the bottom of the installation block.

Preferably, the pressing mechanism comprises: a damping rod, wherein the damping rod is permanently connected to the back of the installation block; a current output device, wherein the current output device is permanently connected to the right end of the damping rod; a second electromagnetic block, wherein the second electromagnetic block is permanently connected to the back of the damping rod; a moving rod, wherein the moving rod is magnetically adsorbed to the back of the second electromagnetic block; a second fixing rod, wherein the second fixing rod is permanently connected to the back of the moving rod; a third electromagnetic block, wherein the third electromagnetic block is permanently connected to the back of the second fixing rod, and is electrically connected to an external current output device; a video recorder, wherein the video recorder is permanently connected to the right lower end of the moving rod; a pressing rod, wherein the pressing rod is permanently connected to the bottom of the moving rod.

Preferably, the video recorder is electrically connected to an external display screen, and the second electromagnetic block is electrically connected to the current output device.

Preferably, the right upper end of the third installation shell the limiting plate is permanently connected to the third installation shell, located at the bottom left end of the installation frame, the right upper end thereof, an electromagnetic block is provided inside the limiting block, and the electromagnetic block is electrically connected to an external current output device.

Preferably, the first electromagnetic block is electrically connected to an external current output device, and the miniature camera is electrically connected to an external display screen.

Preferably, the interior bottom of the first installation shell is permanently connected to the first motor, and the top of the connecting rod, located at the top right end of the first gear plate at the top of the gear, is slidably connected to the interior top of the first installation shell.

Preferably, the bottom of the first installation shell is slidably connected to the top of the installation platform, a slot is disposed at the right side of the front end of the horizonal plate at the back of the installation frame, and the third electromagnetic block is magnetically adsorbed in the slot.

The present invention provides an improved device for monitoring a sticking fault of solenoid valves. Compared with similar devices in the prior art, the embodiment of the present invention has the following beneficial effects.

In the device for monitoring a sticking fault of solenoid valves as described herein, a displacement mechanism is disposed. Through the cooperation of the gear ring, gears, and first gear plates, the device is adapted to solenoid valves with different lengths. In addition, by using clamping monitoring mechanism to clamp the solenoid valve, it could prevent inaccurate or incomplete clamping.

A vibration monitoring mechanism is disposed, combining a tape measure and a miniature camera to indirectly determine the vibration amplitude of the solenoid valve. And whether a sticking phenomenon has occurred could be determined based on the vibration amplitude of the solenoid valve. A clamping monitoring mechanism is disposed, wherein with cooperation of the first rubber gasket, the second rubber gasket, and the sealing gasket, it could ensure that the solenoid valve is in a sealed state after clamping. Air is then introduced into the solenoid valve, and the pressure difference between both sides of the of the solenoid valve is monitored to detect whether a sticking phenomenon occurs during clamping. This allows for monitoring the solenoid valve during clamping and makes the monitoring device multifunctional. A wiping mechanism is disposed, wherein by using a wiping cloth to clean the surface of the solenoid valve, it can determine whether a sticking occurred in the solenoid valve is resulted from blockages caused by dirt inside the solenoid valve.

Additionally, it could protect the solenoid valve through wiping, enhancing monitoring safety. Meanwhile, the vibration monitoring mechanism and wiping mechanism are combined to monitor the state of the solenoid valve from different views, complementing each other to improve accuracy. A pressing mechanism is disposed, which firstly uses a pressing rod to press the valve core inside the solenoid valve, and then records the rebound of the valve core with a video recorder, thereby allowing operators to accurately determine whether the sticking is caused by the valve core. Additionally, it is not necessary to disassemble the solenoid valve during pressing, thereby saving significant time and efforts.

BRIEF DESCRIPTION OF DRAWINGS

The embodiments of the present invention may be better understood by describing the implementations of the embodiments of the present invention in conjunction with the accompanying drawings, in which.

Figure 1:
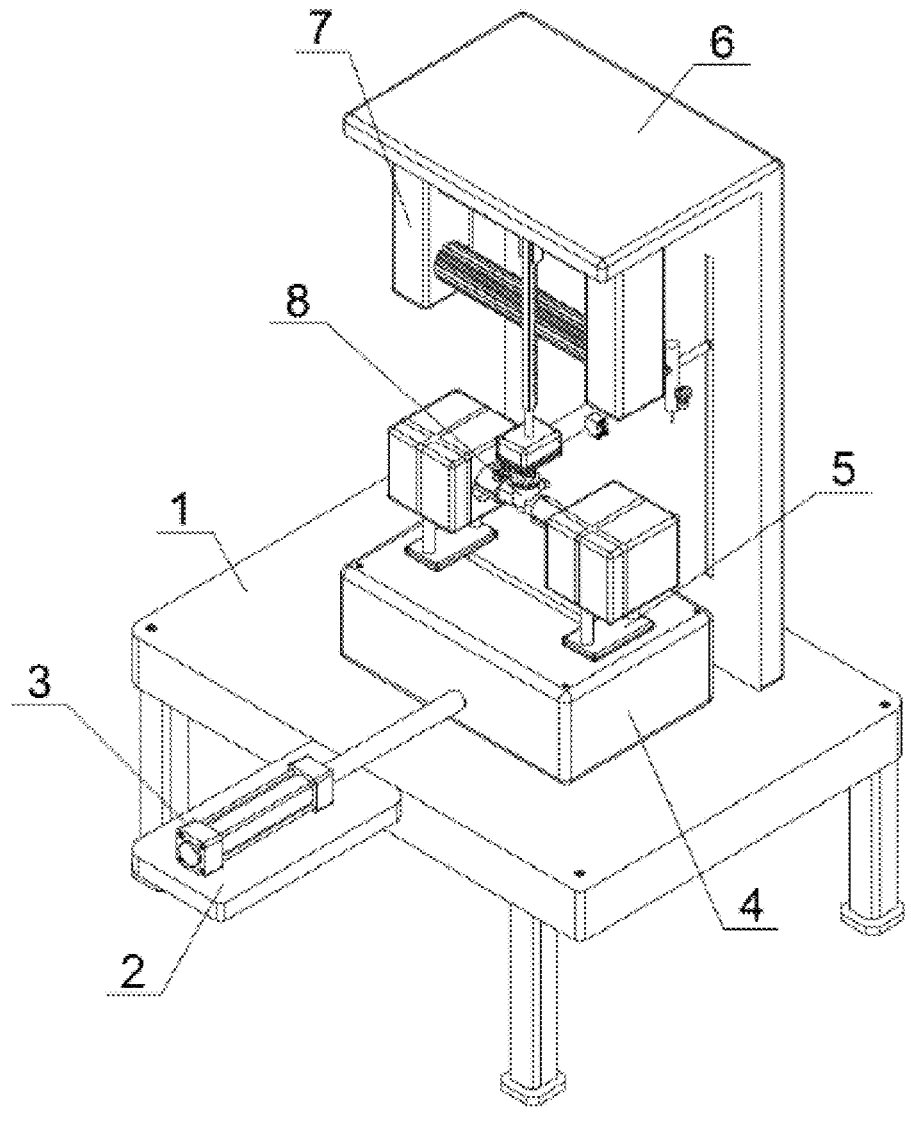
FIG. 1 is a schematic diagram of a three-dimensional structure of the installation platform of the invention.

In the drawings, the reference numerals have the following meanings: installation platform 1;

installation plate 2
first cylinder 3
first installation shell 4; displacement mechanism 5;
moving plate 51;
vibration monitoring mechanism 52; installation rod 521;
rubber rod 522;
first electromagnetic block 52; tape measure 524;
miniature camera 525;
sliding rod 526;
clamping monitoring mechanism 527; second installation shell 5271;
cross frame 5272;
second cylinder 5273;
moving roller 5274;
first connecting plate 5275; rotating rod 5276;
second connecting plate 5277; L-shaped plate 5278;
arc-shaped block 5279;
pressure sensor 52710; air inlet pipe 52711; one-way valve 52712
first rubber gasket 52713; second rubber gasket 52714; sealing gasket 52715;

limiting rod 53;
gear ring 54;
gear 55;
first motor 56; first gear plate 57; connecting rod 58;
installation frame 6;
wiping mechanism 7; third installation shell 71; second motor 72;
belt transmission component 73; solenoid clutch 74;
screw rod 75;
moving block 76;
limiting plate 77;
limiting block 78; second gear plate 79; long gear 710;
first fixing rod 711; installation block 712;
pressing mechanism 713;
damping rod 7131;
current output device 7132;
second electromagnetic block 7133; moving rod 7134;
second fixing rod 7135;
third electromagnetic block 7136; video recorder 7137;
pressing rod 7138;
wiping cloth 714;
solenoid valve 8.

DETAILED DESCRIPTION OF EMBODIMENTS

The principles and characteristics of the invention are described in following paragraphs with reference to FIGS. 1 to 7. However, the illustrated examples are used to only explain the invention rather than limiting its protection scope. In the following paragraphs, the present invention is described more specifically by way of example with reference to the accompanying drawings. It should be noted that the drawings are supplied in simplified forms with non-precise scales, serving only for clarifying explaining the invention in a convenience way.

In the description of the invention, it shall be noted that the terms "center," "top", "upper", "bottom", "lower", "left," "right," "vertical," "horizontal," "inner," and "outer" indicate orientations or positional relationships those determined based on the drawings, for a purpose of simplifying the description of the invention and not suggesting that the apparatus or components must have specific orientations or structures for operation in any means, thus they will not limit the invention in any way. Additionally, terms like "first," "second," and "third" are used descriptively and do not represent or indicate relative importance.

In the description of the invention, it shall be noted that, unless explicitly defined otherwise, terms like "installation," "connected", "attached" and "dispose" should be understood broadly. For example, "connected" can refer to fixed or detachable connections, mechanical or electrical connections, direct or indirect connections through intermediate media, or internal communication between components. Those skilled in the art can understand what these terms specifically means based on the specific context. Hereinafter, the embodiments of the invention are described based on its overall structure.

Figure 2:
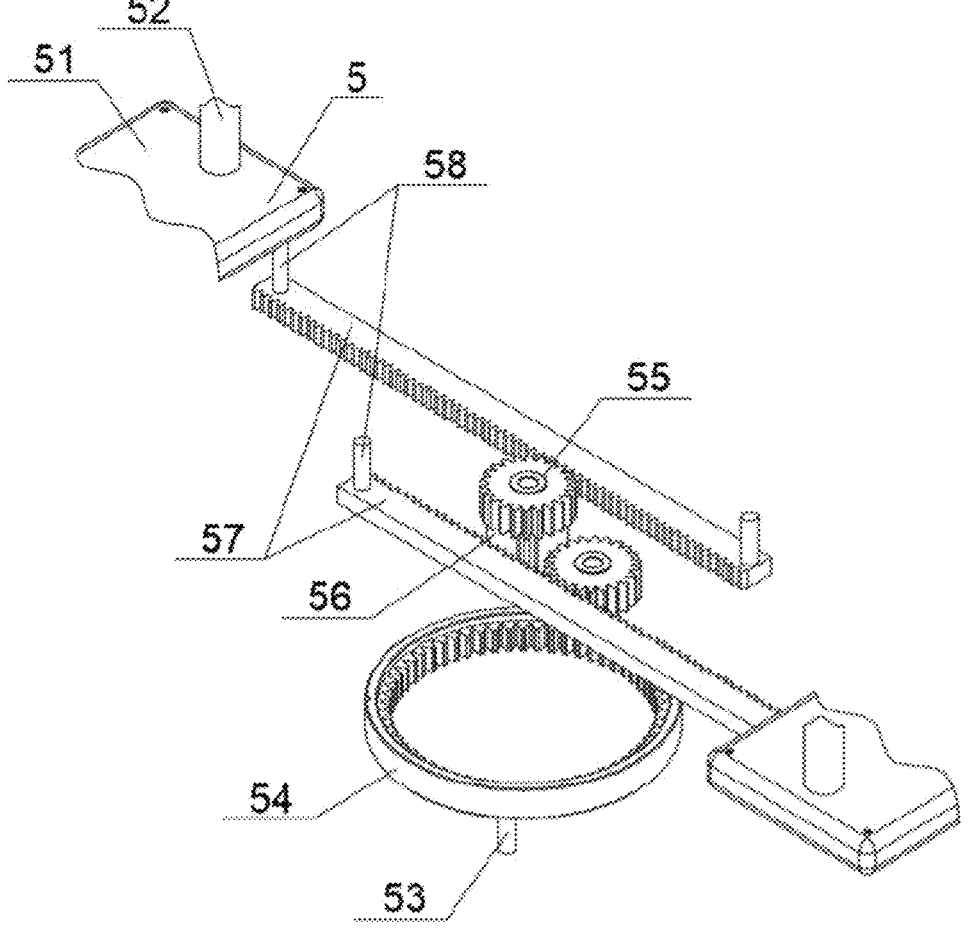
FIG. 2 is a schematic diagram of a three-dimensional exploded structure of the displacement mechanism of the invention.

Embodiment 1 Referring to FIG. 1 and FIG. 2, the invention provides a device for monitoring a sticking fault of solenoid valves, comprising an installation platform 1. The installation platform 1 is permanently connected to an installation plate 2 at the center of the front end thereof, and the installation plate 2 is permanently connected to a first cylinder 3 at the top thereof. A push rod at the back of the first cylinder 3 is permanently connected to a first installation shell 4, and both the top left and right ends of the first installation shell 4 are slidably connected to displacement mechanisms 5. The rear end of the top of the installation platform 1 is permanently connected to an installation frame 6. Both left and right ends of the bottom of the top horizontal plate of the installation frame 6 are permanently connected to wiping mechanisms 7. A solenoid valve 8 is disposed inside the displacement mechanism 5, and the bottom of the first installation shell 4 is slidably connected to the top of the installation platform 1.

The displacement mechanism 5 comprises a moving plate 51, and both left and right ends of the top of the first installation shell 4 are slidably connected to the moving plate 51. Both front and rear ends of the top of the moving plate 51 are permanently connected to vibration monitoring mechanisms 52, and the moving plate 51 facilitates the fixation and installation of the vibration monitoring mechanism 52.

Both front and rear ends of the interior bottom the first installation shell 4 are permanently connected to limiting rods 53. The outer walls of the limiting rods 53 are slidably connected to the bottom of the gear ring 54. Both interior left and right ends of the gear ring 54 are engaged with gears 55, which help to drive the first gear plates 57 to move.

The bottom of the gear 55 internally located at the left end of the gear ring 54 is permanently connected to the top output shaft of the first motor 56. The back of the gear 55 internally located at the left end of the gear ring 54 is engaged with the first gear plate 57, and the first gear plate 57 helps to drive the connecting rod 58 to move.

Both the left and right ends of the top of the first gear plate 57 are permanently connected to connecting rods 58. The top of the connecting rod 58, located at the left end of the top of the first gear plate 57 which is at the back of the gear 55, is permanently connected to the bottom of the moving plate 51. The interior bottom of the first installation shell 4 is permanently connected to the first motor 56, which helps to drive the gear 55 located at the left end of the gear ring 54 to rotate.

The top of the connecting rod 58, located at the right end of the top of the first gear plate 57 which is at the back of the gear 55, is slidably connected to the interior top of the first installation shell 4.

The working principle of the device for monitoring a sticking fault of solenoid valves based on Embodiment 1 is as follows:

When using the device, firstly, place it in the working area and connect it to an external power supply to provide the necessary power for operation of device.

When clamping is required based on the length of the solenoid valve 8, turn on the first motor 56, which drives the gear 55 internally located at the left end of the gear ring 54 to rotate. The gear 55 internally located at the left end of the gear ring 54 drives the gear 54 to rotate, and the gear 54 drives the gear 55 internally located at the right end of the gear ring 54 to rotate. Then, gears 55 at internally located at both left and right ends of the gear ring 54 drive two groups of first gear plates 57 to move toward each other, which gradually reduces the distance between the two groups of first gear plates 57. The two groups of the first gear plates 57 drive the two connecting rods 58 to move towards each other, which in turn drives the two groups of the moving plates 51 to move towards each other. The two groups of the moving plates 51 drive the two groups of clamping monitoring mechanisms 527 to move towards each other through the two groups of vibration monitoring mechanisms 52, making it adapted to solenoid valves 8 with different lengths. The clamping monitoring mechanisms 527 clamp the solenoid valve 8 to prevent inaccurate or incomplete clamping.

Embodiment 2

Figure 3:
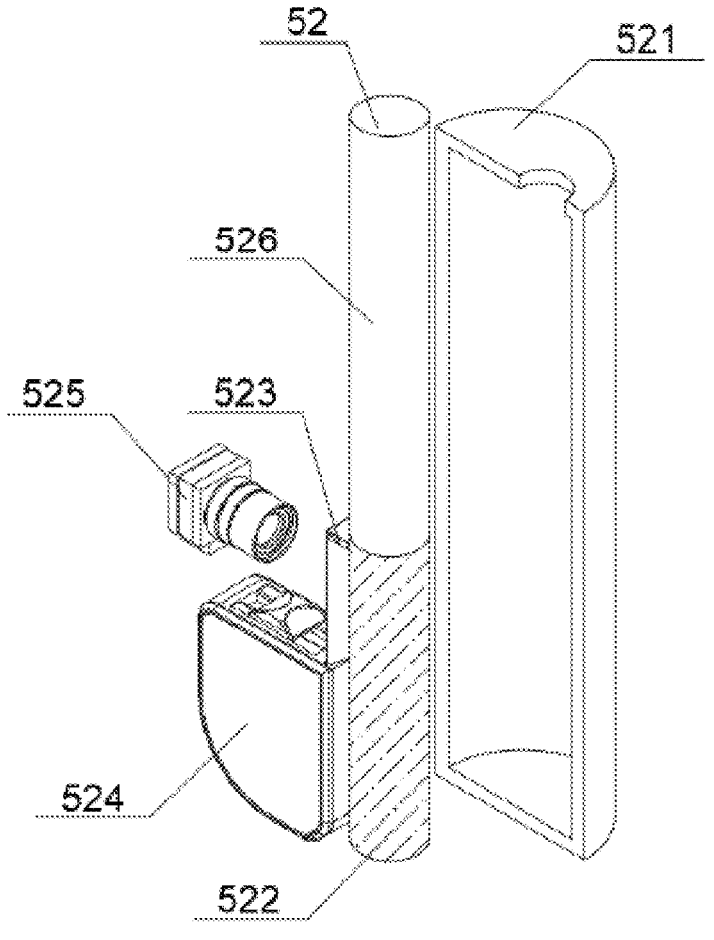
FIG. 3 is a schematic diagram of a three-dimensional exploded structure of the vibration monitoring mechanism of the invention.

Referring to FIG. 3, compared with the device disclosed in Embodiment 1, the device for monitoring a sticking fault of solenoid valves of this embodiment comprises a vibration monitoring mechanism 52. The vibration monitoring mechanism 52 comprises installation rods 521, wherein the installation rods 521 are permanently connected to the moving plate 521 at its top on both front and rear ends thereof. A rubber rod 522 is internally connected to the installation rod 521 at the right bottom thereof. The installation rod 521 facilitates the fixation and installation of the rubber rod 522.

The rubber rod 522 is permanently connected to a first electromagnetic block 523 at its upper left end, the top of the first electromagnetic block 523 magnetically adsorbs a hanging buckle fixed on the tape measure 524. The first electromagnetic block 523 facilitates driving the hanging buckle fixed on the tape measure 524 to move.

The installation rod 521 is permanently connected to a miniature camera 525 at its interior left end. The rubber rod 522 is permanently connected to a sliding rod 526 at the top thereof, and the sliding rod 526 extends through the top right end of the installation rod 521 and is slidably connected to the interior thereof. The miniature camera 525 facilitates shooting the extension and contraction sizes of the tape inside the tape measure 524.

The sliding rod 526 is permanently connected to the clamping monitoring mechanism 527 at the top thereof, and the first electromagnetic block 523 is electrically connected to an external current output device. The miniature camera 525 is electrically connected to an external display screen.

In this embodiment when it is needed to monitor the vibration of the solenoid valve 8, a solenoid coil inside the solenoid valve 8 drives the solenoid valve 8 to operate. When the solenoid valve 8 vibrates, it drives the clamping monitoring mechanism 527 to move downwards, which in turn drives the sliding rod 526 to move downwards, such that the sliding rod 526 presses against the rubber rod 522, forcing it to move downwards. The rubber rod 522 drives the first electromagnetic block 523 to move downwards, which then drives the hanging buckle fixed on the tape measure 524 to move downwards. When the hanging buckle fixed on the tape measure 524 moves downwards, a spring inside the tape measure 524 contracts the tape of the tape measure 524. The miniature camera 525 is then turned on to shoot the extension and contraction sizes of the tape of the tape measure 524, and to transport the captured information to the external display screen. Thus, a staff could observe the data information of the tape of the tape measure 524 on the display screen, thereby indirectly determining the vibration amplitude of the solenoid valve 8. In addition, whether the solenoid valve 8 is subjected to a sticking could be determined based on the vibration amplitude.

Embodiment 3

Figure 4:
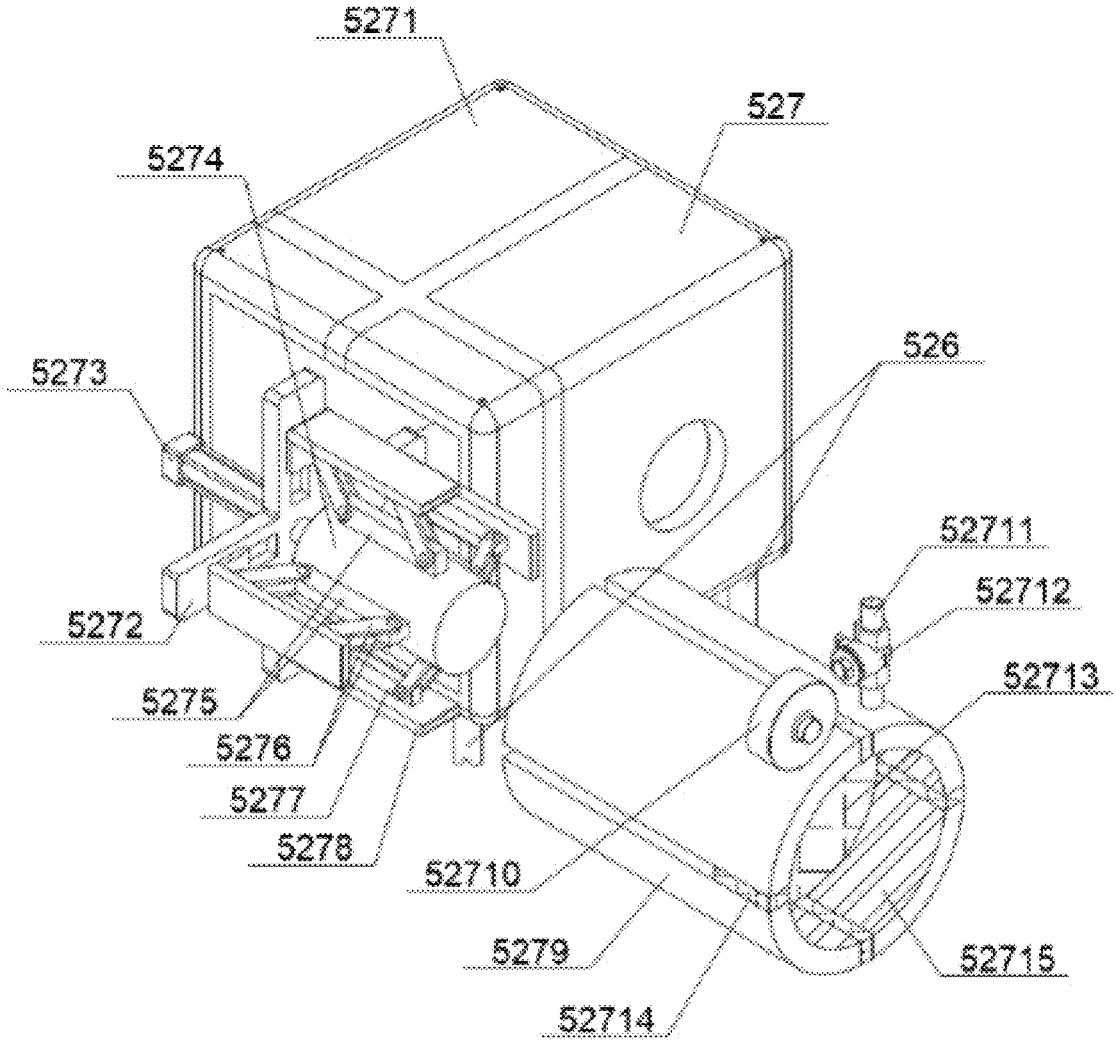
FIG. 4 is a schematic diagram of a three-dimensional exploded structure of the clamping monitoring mechanism of the invention.

Referring to FIG. 4, compared with the device disclosed in Embodiment 1, the device for monitoring a sticking fault of solenoid valves of this embodiment further comprises a clamping monitoring mechanism 527. The clamping monitoring mechanism 527 comprises a second installation shell 5271 permanently connected to the top of the sliding rod 526. A cross frame 5272 is permanently connected to the left end of interior bottom of the second installation shell 5271, which is located at the left end of the top of the first installation shell 4. The second installation shell 5271 facilitates the fixation and installation of the cross frame 5272.

The left end of the cross frame 5272 is permanently connected to a second cylinder 5273. A push rod at the right end of the second cylinder 5273 extends through the cross frame 5272 and is permanently connected to a moving roller 5274. The second cylinder 5273 facilitates driving the moving roller 5274 to move.

Four groups of first connecting plates 5275 are disposed on the outer wall of the moving roller 5274 at equal spaces. Both the upper and lower sides of the left and right ends of the first connecting plates 5275 are rotatably connected to rotating rods 5276. Second connecting plates 5277 are inward rotatably connected to four rotating rods 5276 at the bottom of the moving roller 5274, and rotating rods 5276 facilitates driving the second connecting plates 5277 to move.

The bottom of the second connecting plate 5277 is permanently connected to an L-shaped plate 5278, the bottom of the L-shaped plate 5278 is permanently connected to an arc-shaped block 5279, and the center of the right end of top of the arc-shaped block 5279 is permanently connected to a pressure sensor 52710, which is electrically connected to an external display screen.

An air inlet pipe 52711 is permanently connected to the arc-shaped block 5279 at the rear end of the top thereof. The air inlet pipe 52711 is permanently connected to a one-way valve 52712 at the air inlet thereof. Inside the arc-shaped block 5279, a first rubber gasket 52713 is permanently connected thereto. There are four groups of arc-shaped blocks 5279, and they are permanently connected through second rubber gaskets 52714. The first rubber gasket 52713, the second rubber gasket 52714, and a sealing gasket 52715 helps to keep the solenoid valve 8 sealed after being clamped.

The inner wall of the arc-shaped block 5279 is permanently connected to a sealing gasket 52715, the left ends of the L-shaped plates 5278 are slidably connected to the right end of the cross frame 5272, and the arc-shaped blocks 5279 clamp the solenoid valve 8 therein.

In this embodiment When it is needed to monitor the clamping of the solenoid valve 8, the second cylinder 5273 is turned on. The second cylinder 5273 drives the moving roller 5274 to move rightwards. The moving roller 5274 drives the first connecting plates 5275 around it to move rightwards. As the first connecting plates 5275 move, the rotating rods 5276 are forced to rotate on the outer wall of the first connecting plates 5275. During this rotation of the rotating rods 5276, the four second connecting plates 5277 are forced to move towards each other, reducing the distance among four second connecting plates 5277. The four second connecting plates 5277 drive the four groups of L-shaped plates 5278 to move towards each other on the cross frame 5272. The L-shaped plates 5278 drive the four groups of arc-shaped blocks 5279 to move towards each other. As a result, the four groups of arc-shaped blocks 5279 force the first rubber gasket 52713 and second rubber gasket 52714 to return to their original positions by the elastic forces thereof. In turn, the solenoid valve 8 is clamped by the four groups of arc-shaped blocks 5279. The first rubber gasket 52713, the second rubber gasket 52714, and the sealing gasket 52715 ensure that the solenoid valve 8 is sealed after being clamped. The one-way valve 52712 is then activated to transport air through the air inlet pipe 52711 into the solenoid valve 8.

Then, the pressure sensor 52710 is activated to monitor the pressure values on the left and right sides of the solenoid valve 8 and to transmit the electrical signals to the external display screen. If a significant pressure difference is detected between the two sides of the solenoid valve 8, it indicates that the sealing ring inside the solenoid valve 8 has failed, causing a pressure imbalance inside the solenoid valve 8 and leading to a sticking phenomenon. This allows for monitoring the solenoid valve 8 during clamping, achieving a multifunctional monitoring device.

Figure 5:
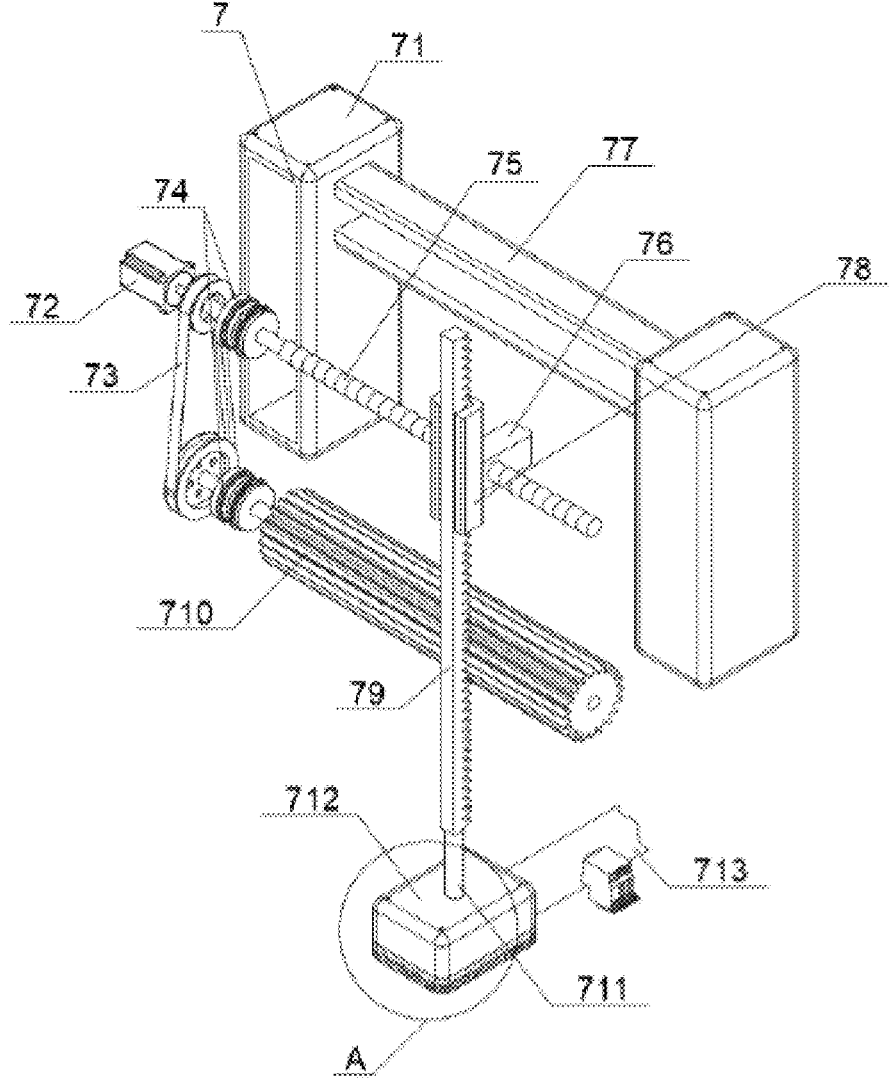
FIG. 5 is a schematic diagram of a three-dimensional exploded structure of the wiping mechanism of the invention.
Figure 6:
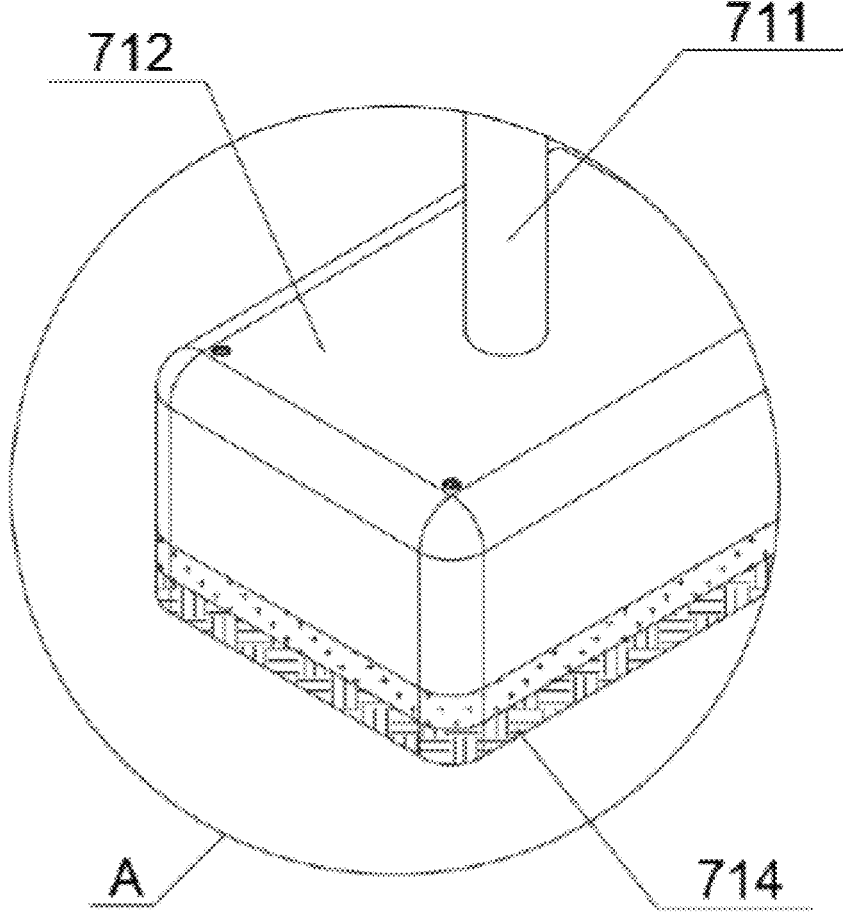
FIG. 6 is an enlarged schematic diagram of the A portion in FIG. 5.

Embodiment 4 Referring to FIG. 5 and FIG. 6, compared with the device described in Embodiment 1, the device for monitoring a sticking fault of solenoid valves of this embodiment comprises a wiping mechanism 7. The wiping mechanism 7 comprises third installation shells 71 permanently connected to both left and right ends of the bottom of the top horizontal plate of the installation frame 6. A second motor 72 is permanently connected to the third installation shell 71 at the left end of the top thereof, and the third installation shell 71 is at the left end of the bottom of the installation frame 6. The third installation shell 71 facilitates the fixation and installation of the second motor 72.

A belt transmission component 73 is permanently connected to the second motor 72 at the right end output shaft thereof. Both upper and lower sides on the right end of the belt transmission component 73 are permanently connected to wheel rods. The wheel rod is segmented and composed of two sets of rod bodies sheathed with each other from left to right. The two sets of rod bodies are fixed to a solenoid clutch 74 by being plugged into the left and right slots of the solenoid clutch 74, respectively. The solenoid clutch 74 facilitates control of the rotation of the wheel rod on the right end of the belt transmission component 73.

The right end of wheel rod at the upper right end of the belt transmission component 73 is permanently connected to a screw rod 75, which extends through the moving block 76 and is connected to the interior thereof via a threaded connection, and outer walls of the moving block 76 are slidably connected to the front end of the limiting plate 77. The screw rod 75 facilitates driving the moving block 76 to move.

The front end of the moving block 76 is permanently connected to a limiting block 78, and a second gear plate 79 is slidably connected to the inside of the limiting block 78, the back of the second gear plate 79 is engaged with a long gear 710, which is rotatably connected to the right lower end of the third installation shell 71 at the bottom left end of the installation frame 6. The long gear 710 facilitates driving the second gear plate 79 to move.

The bottom of the second gear plate 79 is permanently connected to a first fixing rod 711, and the bottom of the first fixing rod 711 is permanently connected to an installation block 712. The back of the installation block 712 is permanently connected to a pressing mechanism 713, and the bottom of the installation block 712 is adhesively connected to a wiping cloth 714, which facilitates wiping the surface of the solenoid valve 8.

The top right end of the third installation shell 71 at the bottom left end of the installation frame 6 is permanently connected to a limiting plate 77. An electromagnetic block, which is electrically connected to an external current output device, is disposed inside the limiting block 78.

In this embodiment when it is needed to monitor the surfaces of the solenoid valve 8, the second motor 72 and the solenoid clutch 74 on the bottom right end of the belt transmission component 73 are started, such that the belt transmission component 73 is driven to work by the second motor 72. The belt transmission component 73 drives the long gear 710 to rotate through the wheel rod, and the long gear 710 drives the second gear plate 79 to move downwards. The second gear plate 79 drives the first fixing rod 711 to move downwards, and the first fixing rod 711 drives the installation block 712 to move downwards, while the installation block 712 drives the wiping cloth 714 to move downward. When the wiping cloth 714 contacts with the top of the solenoid valve 8, the electromagnetic block inside the limiting block 78 is activated by the external current output device, causing the electromagnetic block to magnetically adsorb the second gear plate 79. Then, the solenoid clutch 74 at the bottom right end of the belt transmission component 73 is stopped, and the solenoid clutch 74 at the top right end of the belt transmission component 73 is activated, causing the second motor 72 to drive the screw rod 75 to rotate. The screw rod 75 drives the moving block 76 to move rightwards within the limiting plate 77, and the moving block 76 drives the limiting block 78 to move rightwards. The limiting block 78 drives the second gear plate 79 to move rightwards on the outer wall of the long gear 710 through the magnetic adsorption of the electromagnetic block. The second gear plate 79 drives the first fixing rod 711 to move rightwards, and the first fixing rod 711 drives the installation block 712 to move rightwards. The installation block 712 drives the wiping cloth 714 to move rightward, and thus the wiping cloth 714 cleans the surface of the solenoid valve 8. Then, a staff observes whether solid particles or oil stains are excreted during the wiping process. If any unwanted objects are found, it indicates that the interior of the solenoid valve 8 may be blocked by dirt, causing the solenoid valve 8 to be subject to a sticking. The wiping ensures that no further damage is caused to the internal structure of the solenoid valve 8 during monitoring, thereby improving monitoring safety. Meanwhile, the vibration monitoring mechanism 52 and wiping mechanism 7 are utilized in connection with each other to monitor the state of the solenoid valve 8 from different views, thereby complementing each other and improving monitoring accuracy.

Figure 7:
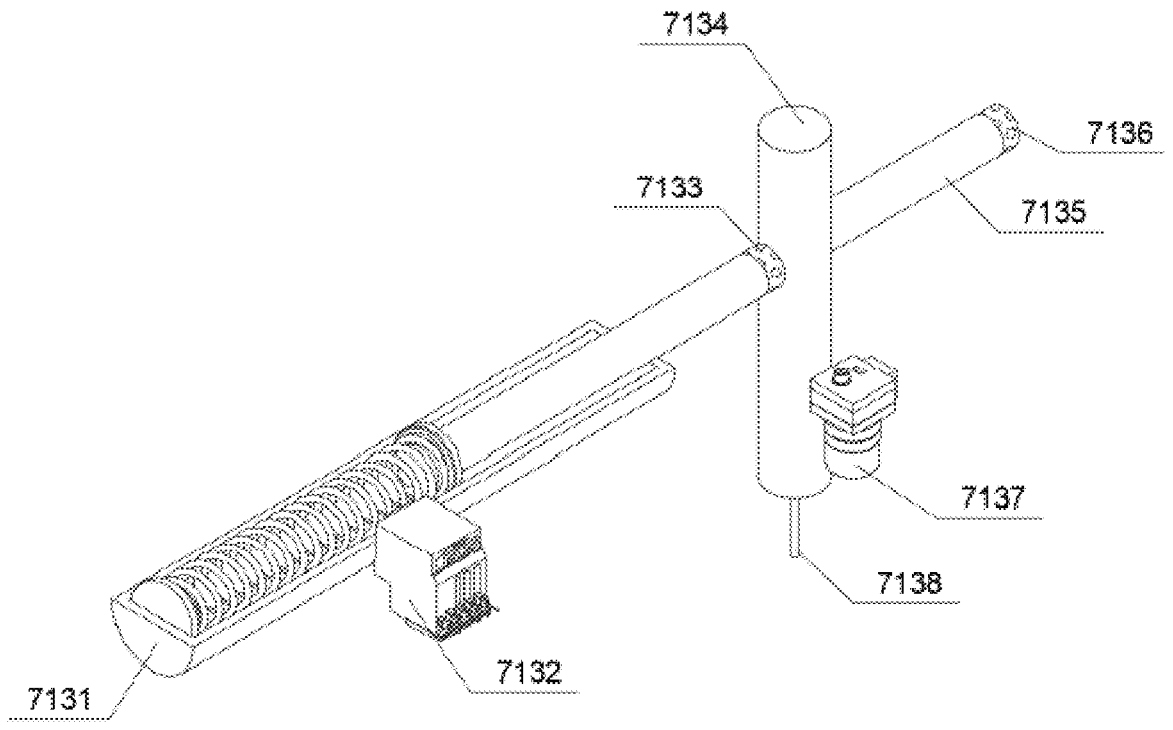
FIG. 7 is a schematic diagram of a three-dimensional structure of the pressing mechanism of the invention.

Embodiment 5 referring to FIG. 7, compared with the device disclosed in Embodiment 1, the device for monitoring a sticking fault of solenoid valves of this embodiment further comprises a pressing mechanism 713. The pressing mechanism 713 comprises a damping rod 7131, which is permanently connected to the back of the installation block 712. The right end of the damping rod 7131 is permanently connected to a current output device 7132. An electromagnetic spring is permanently connected inside the damping rod 7131, and the electromagnetic spring is further electrically connected to an external current output device.

The back of the damping rod 7131 is permanently connected to a second electromagnetic block 7133, while the second electromagnetic block 7133 is magnetically adsorbed to a moving rod 7134 at its back, facilitating driving the second fixing rod 7135 to move.

The back of the moving rod 7134 is permanently connected to a second fixing rod 7135, the back of the second fixing rod 7135 permanently connected to a third electromagnetic block 7136, and the third electromagnetic block 7136 is electrically connected to an external current output device. The lower right end of the moving rod 7134 is permanently connected to a video recorder 7137, which records the rebound of the valve core swiftly.

The bottom of the moving rod 7134 is permanently connected to a pressing rod 7138. The right side of the front end of the horizonal plate at the back of the installation frame 6 is provided with a slot. The slot is magnetically adsorbed to a third electromagnetic block 7136 therein. The video recorder 7137 is electrically connected to an external display screen, and the second electromagnetic block 7133 is electrically connected to the current output device 7132.

In this embodiment when it is needed to determine whether the valve core of the solenoid valve 8 is stuck, the operation of electromagnetic spring inside the damping rod 7131 is stopped by the external current output device. This causes the damping rod 7131 to move backward under the restoring force of the electromagnetic spring, thereby driving the second electromagnetic block 7133 to move backward accordingly. The second electromagnetic block 7133 is started to operate by the current output device 7132, causing it to magnetically adsorb the moving rod 7134. Then, the operation of the third electromagnetic block 7136 is stopped by the external current output device. Then, the electromagnetic spring inside the damping rod 7131 is activated to operate by the external current output device, causing the damping rod 7131 to move forward under magnetic influence, thereby driving the second electromagnetic block 7133 to drive the moving rod 7134 to move forward accordingly. The moving rod 7134 drives the second fixing rod 7135 and the third electromagnetic block 7136 to move forward, separating the third electromagnetic block 7136 from the slot on the installation frame 6. Then, the second motor 72 and the solenoid clutch 74 on the lower right end of the belt transmission component 73 are activated. The steps in Embodiment 4 are repeated. The installation block 712 drives the damping rod 7131 to move, and the damping rod 7131 drives the moving rod 7134 to move through the second electromagnetic block 7133, and the moving rod 7134 in turn drives the pressing rod 7138 to move, thus pressing the valve core inside the solenoid valve 8. The video recorder 7137 is then turned on to record the rebound of the valve core. If the valve core rebounds quickly, it indicates that the valve core is functioning normally. However, if the valve core does not rebound quickly, it indicates that the valve core may be stuck, causing the solenoid valve 8 to be subjected to a sticking. This allows a staff to accurately determine whether the sticking phenomenon is caused by the valve core. Additionally, it is not necessary to disassemble the solenoid valve 8 during pressing, saving significant time and efforts.

The invention provides an improved device for monitoring a sticking fault of solenoid valves. A displacement mechanism 5 is disposed, wherein, through the cooperation of the gear ring 54, gears 55, and first gear plates 57, the device is adapted to solenoid valves 8 with different lengths. In addition, by using clamping monitoring mechanism 527 to clamp the solenoid valve 8, it could prevent inaccurate or incomplete clamping. A vibration monitoring mechanism 52 is disposed, combining a tape measure 524 and a miniature camera 525 to indirectly determine the vibration amplitude of the solenoid valve 8. And whether a sticking phenomenon has occurred could be determined based on the vibration amplitude of the solenoid valve 8. A clamping monitoring mechanism 527 is disposed, wherein with cooperation of the first rubber gasket 52713, the second rubber gasket 52714, and the sealing gasket 52715, it could ensure that the solenoid valve 8 is in a sealed state after clamping. Air is then introduced into the solenoid valve 8, and the pressure difference between both sides of the of the solenoid valve 8 is monitored to detect whether a sticking phenomenon occurs during clamping. This allows for monitoring the solenoid valve during clamping and makes the monitoring device multifunctional. A wiping mechanism 7 is disposed, wherein by using a wiping cloth 714 to clean the surface of the solenoid valve 8, it can determine whether a sticking occurred in the solenoid valve 8 is resulted from blockages caused by dirt inside the solenoid valve 8. Additionally, it could protect the solenoid valve 8 through wiping, enhancing monitoring safety. Meanwhile, the vibration monitoring mechanism 52 and wiping mechanism 7 are combined to monitor the state of the solenoid valve 8 from different views, complementing each other to improve accuracy. A pressing mechanism 713 is disposed, which firstly uses a pressing rod 7138 to press the valve core inside the solenoid valve 8, and then records the rebound of the valve core with a video recorder 7137, thereby allowing operators to accurately determine whether the sticking is caused by the valve core. Additionally, it is not necessary to disassemble the solenoid valve 8 during pressing, thereby saving significant time and efforts.

The above description and drawings illustrate the basic principles, main features, and advantages of the invention. Standard parts used in the invention can be purchased from the market, and all custom parts can be ordered based on the description and drawings. Specific connection methods for the parts use mature techniques such as bolts, rivets, and welding from existing technologies. Machinery, parts, and equipment use conventional models from existing technologies, and electrical connections use conventional methods in existing technologies, which are not described in detail here.

The above description of the disclosed embodiments enables any person skilled in the art to implement or use the invention. Various modifications to these embodiments will be apparent to any person skilled in the art, and general principles defined in this document can be implemented in other embodiments without departing from the spirit or scope of the invention. Therefore, the invention is not limited to the embodiments shown in this document but should conform to the broadest scope consistent with the principles and novel features disclosed herein.

What is claimed is:

1. A device for monitoring a sticking fault of solenoid valves, comprising an installation platform (1), wherein the installation platform (1) is permanently connected to an installation plate (2) at the center of the front end of the installation platform (1), the installation plate (2) is permanently connected to a first cylinder (3) at the top thereof, and a push rod at back of the first cylinder (3) is permanently connected to a first installation shell (4), both left and right ends of the top of the first installation shell (4) are slidably connected to displacement mechanisms (5), the installation platform (1) is permanently connected to an installation frame (6) at the rear end of the top of the installation platform (1), both left and right ends of the bottom of a horizontal plate at the top of the installation frame (6) are permanently connected to wiping mechanisms (7), and a solenoid valve (8) is disposed inside the displacement mechanism (5), characterized in that:

the displacement mechanism (5) comprises: moving plates (51), wherein both the top left and right ends of the first installation shell (4) are slidably connected to the moving plates (51); vibration monitoring mechanisms (52), which are permanently connected to the moving plates (51) at both the top front end and top rear end thereof; limiting rods (53), which are permanently connected to the first installation shell (4) at both the interior bottom front end and interior bottom rear end thereof; a gear ring (54), the bottom of which is slidably connected to the outer wall of the limiting rod (53); gears (55), wherein both the interior left and right ends of the gear ring (54) are both engaged with gears (55); a first motor (56), wherein the top output shaft of the first motor (56) is permanently connected to bottom of the gear (55) at the interior left end of the gear ring (54);

first gear plates (57), wherein the gear ring (54) is engaged with the first gear plates (57) at the back of the gear (55) at interior left end thereof; connecting rods (58), which are permanently connected to the first gear plate (57) at both top left and right ends thereof; wherein, the top of the connecting rod (58), located at top left end of the first gear plate (57) which is at the back of the gear (55), is permanently connected to the bottom of the moving plate (51);

the vibration monitoring mechanism (52) comprises: installation rods (521), wherein the installation rods (521) are permanently connected to the moving plate (51) at both top front and rear ends thereof; a rubber rod (522), wherein the rubber rod (522) is permanently connected to the installation rod (521) at the right end of the interior bottom thereof; a first electromagnetic block (523), wherein the electromagnetic block (523) is permanently connected to the upper left end of the rubber rod (522); a tape measure (524), wherein the top of the first electromagnetic block (523) is magnetically adsorbed to a hanging buckle fixed on the tape measure (524); a miniature camera (525), wherein the miniature camera (525) is permanently connected to the installation rod (521) at the interior left end thereof; a sliding rod (526), wherein the sliding rod (526) is permanently connected to the top of the rubber rod (522), and the sliding rod (526) extends through the top right end of the installation rod (521) and is slidably connected to the interior thereof; clamping monitoring mechanisms (527), wherein the top of the sliding rod (526) is permanently connected to the clamping monitoring mechanism (527).

2. The device for monitoring a sticking fault of solenoid valves according to claim 1, characterized in that:

the clamping monitoring mechanism (527) comprises: a second installation shell (5271), wherein the second installation shell (5271) is permanently connected to the top of the sliding rod (526); a cross frame (5272), wherein the cross frame (5272) is permanently connected to the second installation shell (5271), located at the top left end of the first installation shell (4), at the interior bottom left end thereof; a second cylinder (5273), wherein the second cylinder (5273) is permanently connected to the left end of the cross frame (5272); a moving roller (5274), wherein a push rod at the right end of the second cylinder (5273) extends through the cross frame (5272) and is permanently connected to the moving roller (5274); first connecting plates (5275), wherein four groups of the first connecting plates (5275) are disposed on the outer wall of the moving roller (5274) at equal spaces; rotating rods (5276), wherein the rotating rods (5276) are rotatably connected to both the upper and lower sides of both left and right ends of the first connecting plates (5275); second connecting plates (5277), wherein the second connecting plates (5277) are rotatably connected to and inside the four groups of rotating rods (5276) at the bottom of the moving roller (5274); L-shaped plates (5278), wherein the L-shaped plates (5278) are permanently connected to the bottoms of the second connecting plates (5277); arc-shaped blocks (5279), wherein the arc-shaped blocks (5279) are permanently connected to the bottoms of the L-shaped plates (5278); a pressure sensor (52710), wherein the pressure sensor is permanently connected to the center of the top right end of the arc-shaped block (5279); an air inlet pipe (52711), wherein the air inlet pipe (52711) is permanently connected to the top rear end of the arc-shaped block (5279); a one-way valve (52712), which is permanently connected to the air inlet pipe (52711) at the air inlet thereof; a first rubber gasket (52713), which is internally and permanently connected to the arc-shaped block (5279); a second rubber gasket (52714), wherein there are four groups of the arc-shaped blocks (5279), and they are permanently connected through the second rubber gaskets (52714); a sealing gasket (52715), wherein the sealing gasket (52715) is permanently connected to the inner wall of the arc-shaped blocks (5279); wherein, the left ends of the L-shaped plates (5278) are slidably connected to the right end of the cross frame (5272), and the solenoid valve (8) is clamped inside the arc-shaped blocks (5279).

3. The device for monitoring a sticking fault of solenoid valves according to claim 2, characterized in that:
the wiping mechanism (7) comprises: third installation shells (71), wherein the third installation shells (71) are permanently connected to both the bottom left and right ends of the horizonal plate located at the top of the installation frame (6); a second motor (72), wherein the second motor (72) is permanently connected to the left upper end of the third installation shell (71) located at the bottom left end of the installation frame (6); a belt transmission component (73), wherein both upper and lower sides on the right end of the belt transmission component (73) are permanently connected to wheel rods, the wheel rod is segmented and composed of two sets of rod bodies sheathed with each other from left to right, and the two sets of rod bodies are fixed to a solenoid clutch (74) by being plugged into the left and right slots of the solenoid clutch (74), respectively; a screw rod (75), wherein the screw rod (75) is permanently connected to the right end of the wheel rod located at the right upper end of the belt transmission component (73); a moving block (76), wherein the screw rod (75) extends through the moving block (76) and is connected to the interior thereof via a threaded connection; a limiting plate (77), wherein the front end of the limiting plate (77) is slidably connected to the outer wall of the moving block (76); a limiting block (78), wherein the limiting block (78) is permanently connected to front end of the moving block (76); a second gear plate (79), wherein the second gear plate (79) is internally and slidably connected to limiting block (78); a long gear (710), wherein the long gear (710) is engaged with the back of the second gear plate (79), and is rotatably connected to the right lower end of the third installation shell (71) located at the bottom left end of the installation frame (6); a first fixing rod (711), wherein the first fixing rod (711) is permanently connected to the bottom of the second gear plate (79); an installation block (712), wherein the installation block (712) is permanently connected to the bottom of the first fixing rod (711); a pressing mechanism (713), wherein the pressing mechanism (713) is permanently connected to the back of the installation block (712); a wiping cloth (714), wherein the wiping cloth (714) is adhesively connected to the bottom of the installation block (712).

4. The device for monitoring a sticking fault of solenoid valves according to claim 3, characterized in that:
the pressing mechanism (713) comprises: a damping rod (7131), wherein the damping rod (7131) is permanently connected to the back of the installation block (712); a current output device (7132), wherein the current output device (7132) is permanently connected to the right end of the damping rod (7131); a second electromagnetic block (7133), wherein the second electromagnetic block (7133) is permanently connected to the back of the damping rod (7131); a moving rod (7134), wherein the moving rod (7134) is magnetically adsorbed to the back of the second electromagnetic block (7133); a second fixing rod (7135), wherein the second fixing rod (7135) is permanently connected to the back of the moving rod (7134); a third electromagnetic block (7136), wherein the third electromagnetic block (7136) is permanently connected to the back of the second fixing rod (7135), and is electrically connected to an external current output device; a video recorder (7137), wherein the video recorder (7137) is permanently connected to the right lower end of the moving rod (7134); a pressing rod (7138), wherein the pressing rod (7138) is permanently connected to the bottom of the moving rod (7134).

5. The device for monitoring a sticking fault of solenoid valves according to claim 4, characterized in that:
the video recorder (7137) is electrically connected to an external display screen, and the second electromagnetic block (7133) is electrically connected to the current output device (7132).

6. The device for monitoring a sticking fault of solenoid valves according to claim 5, characterized in that:
the right upper end of the third installation shell (71) the limiting plate (77) is permanently connected to the third installation shell (71), located at the bottom left end of the installation frame (6), the right upper end thereof, an electromagnetic block is provided inside the limiting block (78), and the electromagnetic block is electrically connected to an external current output device.

7. The device for monitoring a sticking fault of solenoid valves according to claim 6, characterized in that:
the first electromagnetic block (523) is electrically connected to an external current output device, and the miniature camera (525) is electrically connected to an external display screen.

8. The device for monitoring a sticking fault of solenoid valves according to claim 7, characterized in that:
the interior bottom of the first installation shell (4) is permanently connected to the first motor (56), and the top of the connecting rod (58), located at the top right end of the first gear plate (57) at the top of the gear (55), is slidably connected to the interior top of the first installation shell (4).

9. The device for monitoring a sticking fault of solenoid valves according to claim 8, characterized in that:
the bottom of the first installation shell (4) is slidably connected to the top of the installation platform (1), a slot is disposed at the right side of the front end of the horizonal plate at the back of the installation frame (6), and the third electromagnetic block (7136) is magnetically adsorbed in the slot.

* * * * *